United States Patent Office 3,667,901

Patented June 6, 1972

3,667,901
METHOD OF PRODUCING ORTHOVANADATES OF RARE-EARTH METALS

Vsevolod Semenovich Krylov, Ulitsa Tereshkovoi 2, kv. 65; Ivan Nikolaevich Popkov, Ulitsa Tereshkovoi 2, kv. 14; Robert Leonidovich Magunov, Ulitsa Ostrovidova 30, kv. 16; and Mikhail Nikolaevich Puring, Ulitsa Tereshkovoi 2, kv. 37, all of Odessa, U.S.S.R.; Khachatur Saakovich Bagdasarov, Ulitsa Garibaldi 59, korpus 2, kv. 42, Moscow, U.S.S.R.; Raisa Fedorovna Sagina, Ulitsa Tereshkovoi 2, kv. 28, Odessa, U.S.S.R.; and Viktor Innokentievich Popov, Ulitsa Lenina 24, kv. 16, Fryazino Moskovskoi Oblast, U.S.S.R.

No Drawing. Filed Aug. 21, 1970, Ser. No. 66,143
Int. Cl. C22b *59/00*
U.S. Cl. 23—19 V 2 Claims

ABSTRACT OF THE DISCLOSURE

A method of producing orthovanadates of rare-earth metals, consisting in that aqueous solutions of nitrates of rare-earth metals are prepared with pH=5.5–6.2, and an aqueous solution of ammonium metavanadate is prepared with pH=9.8–11, whereupon said solutions are interacted under dynamic conditions with Re=1000–6000, till the pH of the medium becomes equal to 9.5–10.5. The resulting precipitate of the orthovanadate of a rare -earth metal is separated from the solution, dried at a temperature of 80–120° C., and then calcined at a temperature of 900–1200° C.

The present method makes it possible to preclude the formation of polyvanadates and to obtain chemically and granulometrically homogeneous desired products, adequate to meet the requiremens of various branches of engineering and industry, such as quantum electronics, analytical chemistry, color television.

The present invention relates to methods of producing orthovanadates of rare-earth metals.

Said orthovanadates are used for manufacturing color kinescopes, for growing single crystals employed as active substances in laser oscillators, for making fluorescent light sources, in fluorescence analysis for detecting admixtures of rare-earth metals in amounts of up to $10^{-6}$ percent in yttrium oxide, etc.

Known in the art is a ceramic method of producing orthovanadates of rare-earth metals, which is based on sintering oxides or salts of said metals with vanadium pentoxide or with ammonium metavanadate at a temperature of 900–1200° C.

Also known is a method of producing orthovanadates of rare-earth metals by reacting aqueous solutions of nitrates of said metals with an aqueous solution of ammonium metananadate. The pH of the medium is equal to 5.15–5.40. The resulting precipitate of the orthovanadate of a rare-earth metal is separated from the solution by sucking it through a funnel equipped with a Schott filter, washed with distilled water and dried in air to constant weight.

The ceramic method of producing orthovanadates of rare-earth metals disadvantageous in that it fails to ensure homogeneity and constancy of the composition throughout the bulk of the material.

The second known method is disadvantageous in that it proves difficult to obtain a chemically and granulometrically homogeneous final product, since polyvanadates form concurrently with orthovanadates.

Thus, the known methods do not provide for the obtaining of orthovanadates of rare-earth metals which would meet the requirements placed thereupon by various branches of industry, such as those to be met by the charge for growing crystals according to the Verneuil process.

It is an object of the present invention to provide such a method of producing orthovanadates of rare-earth metals, which would make it possible to obtain final products, homogeneous as to their chemical and granulometric composition.

Another object of the present invention is to provide such a method which would make it possible to preclude the formation of polyvanadates of rare-earth metals.

In accordance with said and other objects, the present invention consists in that aqueous solutions of nitrates of rare-earth metals with pH=5.5–6.2 and an aqueous solution of ammonium metavanadate with pH=9.8–11 are prepared, after which said solutions are interreacted under dynamic conditions with Reynolds number of 1000–6000, till the pH of the medium becomes 9.5–10.5, the resulting precipitate of the orthovanadate of the rare-earth metal being then separated from the solution, dried at a temperature of 80.120° C., and calcined at a temperature of 900–1200° C.

For precluding the formation of polyvanadates, it is recommended to prepare aqueous solutions of nitrates of rare-earth metals with pH=6–6.2, and the solution of ammonium metavanadate with pH=10–11, and to carry out the process of interaction of the starting solutions till the pH of the medium becomes equal to 9.8–10.5.

When elaborating the present method, we have established that orthovanadate-ions exist in a strongly alkaline medium, and therefore the selection of the pH value for the starting solutions was determined as follows.

A solution of ammonium metavanadate should feature a high concentration of $[OH]^-$, since orthovanadate-ions will be stable only in a strongly alkaline medium. On the other hand, a very high concentration of $[OH]^-$ in the solution of ammonium metavanadate is inadmissible,, since in such a case, when the initial solutions are combined, the rare-earth metals will precipitate in the form of hydroxides. The use of strongly acidic solutions of nitrates of rare-earth metals (pH=1–4) is also inexpedient, since after the initial solutions are combined, first a neutralization process will take place, then the pH of the medium will be lowered, and the orthovanadate-ions will partially pass into pyro-, and in a more acidic medium, into meta-ions.

Thus, the method proposed herein makes it possible to preclude the formation of polyvanadates and to obtain chemically and granulometrically homogeneous final products which adequately meet the requirements placed upon them by various branches of industry. Moreover, the present method makes it possible to produce orthovanadates of rare-earth metals, featuring better spectral and fluorescence characteristics.

The present method of producing orthovanadates of rare-earth metals is effected as follows.

An aqueous solution of ammonium metavanadate is prepared, and the pH of the solution is adjusted to be 9.8–11, preferably 10–11, by adding an aqueous solution of ammonia thereto.

Aqueous solutions of nitrates of rare-earth metals are also prepared, and the pH values thereof are adjusted to be 5.5–6.2, preferably 6–6.2, by adding an aqueous solution of ammonia thereto. Then the aqueous solution of ammonium metavanadate is combined with an aqueous solution of a nitrate of a rare-earth metal, or with aqueous solutions of nitrates of two or several rare-earth metals. In the latter case the resulting orthovanadates of rare-earth metals feature improved spectral and fluorescence characteristics.

The process of interaction of aqueous solutions of said salts is carried out in a hermetically sealed reactor at room temperature under intense stirring (Re=1000–

6000). The stirring is required for an equilibrium to be established within the system. The process of interaction is continued till the pH of the medium becomes equal to 9.5–10.5. The precipitated orthovanadates of rare-earth metals are separated from the solution by filtration, evaporation, etc. According to the data of thermogravimetric analysis, the chemical composition of the obtained salts in an air-dry state conforms to the formula $$LnVO_4 \cdot 2H_2O \text{ or } Ln_{100-x}L'nVO_4 \cdot 2H_2O$$

where Ln is a rare-earth metal, L'n is another rare-earth metal $x=10^{-2}-99$.

After being separated from the solution, the precipitate is dried at a temperature of 80–120° C., and then calcined at a temperature of 900–1200° C. As the temperature of calcining rises, the intensity of the maxima on the roentgenogram increases, which is associated with the growth of small crystals of orthovanadates of rare-earth metals. After the calcining the size of such crystals is 1–8 mμ. The yield of the final product was 93–96% of the theoretical amount.

For a better understanding of the present invention, given hereinbelow are examples of producing orthovanadates of rare-earth metals.

EXAMPLE 1

An aqueous solution of ammonium metavanadate was prepared in the following fashion.

3000 g. of ammonium metavanadate of "special purity" grade were dissolved in 100 lit. of bidistilled water. The solution was filtered on a nutsche filter with a surface area of 1 sq. m. The filtrate was diluted with bidistilled water to a volume of 600 lit. The concentration of vanadium in the resulting solution was determined by titration with Mohr's salt. The concentration of vanadium in the solution was equal to 0.1 mole per lit. The pH value of the solution was adjusted to be 11 by adding a 25% aqueous solution of ammonia. The pH of the solution was measured with the help of a pH-meter.

An aqueous solution of yttrium nitrate was prepared as follows.

2800 g. of yttrium oxide of "yttrium oxide for phosphors" grade were dissolved at a temperature of 70° C. in 50 lit. of bidistilled water, with the addition of 10 lit. of 70% nitric acid of "special purity" grade (sp. gr. of 1.42 g. per cu. cm. at 20° C.).

The solution was filtered, the filtrate was cooled, and then a 25% aqueous solution of ammonia was added thereto till the pH value was adjusted to be 6. The volume of the solution was brought to 100 lit. by adding bidistilled water thereto. The concentration of the prepared solution of yttrium nitrate equal to 0.2 mole per lit. of yttrium.

Into the prepared aqueous solution of ammonium metavanadate in an amount of 590 lit., which was placed in an enamelled reactor of 1000 lit. capacity, 100 lit. of the aqueous solution of yttrium nitrate were poured in a thin stream, with stirring. The synthesis was carried out over a period of 24 hours at room temperature, under dynamic conditions with Re=3000. The pH of the medium was equal to 9.5. On completion of the process of synthesis, the suspension was allowed to settle for 6 hours with the formation of a precipitate, which was yttrium orthovanadate $YVO_4 \cdot 2H_2O$. Further, the transparent mother liquor in an amount of 400 lit. was decanted, and after that the precipitate was filtered from the remaining mother liquor on a nutsche filter with a surface area of 1.5 sq. m. The precipitate thus separated from the solution was dried in a drying cabinet at a temperature of 110° C. during 5 hours. The dried precipitate was ground in jasper mills and sifted through a sieve made from nylon-6. The sifted powder was calcined in platinum trays at a temperature of 900° C. for 4 hours.

5000 g. of crystalline yttrium orthovanadate $YVO_4$ were obtained, the product being of white color, the crystals sizing 1–2 mμ. The yield of the desired product was 95% of the theoretical amount.

The data of the chemical analysis of the obtained yttrium vanadate are presented in the table below.

| Yttrium orthovanadate ($YVO_4$) | Calculated, percent | Found, percent |
|---|---|---|
| Yttrium oxide | 55.4 | 55.7 |
| Vanadium pentoxide | 44.6 | 44.2 |

EXAMPLE 2

An aqueous solution of ammonium metavanadate was prepared as follows.

136 g. of ammonium metavanadate of "special purity" grade were dissolved in 12 lit. of bidistilled water. The concentration of ammonium metavanadate in the solution was 0.085 mole per lit. for vanadium. Then the pH of the solution was adjusted to 10.5 by adding a 25% aqueous solution of ammonia.

An aqueous solution of terbium nitrate was prepared in the following way.

212 g. of terbium oxide of high purity grade were dissolved with heating to 70° C. in 0.5 lit. of 70% nitric acid of "special purity" grade (sp. gr. of 1.42 g. per cu. cm. at 20° C.). The concentration of the solution of terbium nitrate was 0.22 mole per lit. of terbium. Then the pH of the solution was adjusted to 5.8 by adding a 25% aqueous solution of ammonia.

To the aqueous solution of ammonium metavanadate, which had been poured into a hermetic reactor, the aqueous solution of terbium nitrate was added in a stoichiometric ratio. The process of synthesis was carried out during 22 hours at room temperature under dynamic conditions, with the r.p.m. of the stirrer corresponding to Re=3000. The pH of the medium was equal to 9.6. On completion of the synthesis the pulp was allowed to settle over a period of 15 hours. The clarified solution was decanted. The precipitate was filtered on a nutsche filter, dried at a temperature of 100° C. during 2 hours, and calcined at a temperature of 900° C. during 2 hours.

300 g. of crystalline terbium orthovanadate were obtained, yellowish-white in color, with the size of crystals 2–2.5 mμ. The yield of the desired product was 94% of the thoretical amount.

The results of the chemical analysis of the obtained terbium orthovanadate are presented in the table below.

| Terbium orthovanadate ($TbVO_4$) | Calculated, percent | Found, percent |
|---|---|---|
| Terbium oxide | 66.8 | 66.2 |
| Vanadium pentoxide | 33.2 | 33.4 |

EXAMPLE 3

An aqueous solution of ammonium metavanadate was prepared in the following manner.

148 g. of ammonium metavanadate of "special purity" grade were dissolved in 12 lit. of bidistilled water. The concentration of ammonium metavanadate in the solution was 0.09 mole per lit. for vanadium. Then the pH of the solution was adjusted to be 10.5 by adding a 25% aqueous solution of ammonia.

An aqueous solution of dysprosium nitrate was prepared as follows.

250 g. of high-purity dysprosium oxide were dissolved, with heating to 80° C., in 0.6 lit. of 70% nitric acid of "special purity" grade (sp. gr. of 1.42 g. per cu. cm. at 20° C.). The concentration of the dysprosium nitrate solution was equal to 0.23 mole per lit. of dysprosium. Then the pH of the solution was adjusted to be 5.8 by adding a 25% aqueous solution of ammonia.

To the aqueous solution of ammonium metavanadate, which had been poured into a hermetic reactor, the aqueous solution of dysprosium nitrate was added in a stoichiometric ratio. The process of synthesis was carried out over a period of 22 hours at room temperature and under dynamic conditions with the r.p.m. of the stirrer corresponding to Re=3500. The pH of the medium was equal to 9.7. On completion of the process of synthesis, the pulp was allowed to settle during a period of 16 hours. The clarified solution was decanted. The precipitate was filtered on a nutsche filter, dried at a temperature of 90° C. for 2.5 hours, and calcined at a temperature of 1000° C. for 2 hours.

350 g. of crystalline dysprosium orthovanadate were obtained, the product being of white color, with crystals of 2.5–3 mμ in size. The yield of the desired product was 94% of the theoretical amount.

The results of the chemical analysis of the obtained dysprosium orthovanadate are presented in the table below.

| Dysprosium orthovanadate ($DyVO_4$) | Calculated, percent | Found, percent |
|---|---|---|
| Dysprosium oxide | 67.2 | 67.3 |
| Vanadium pentoxide | 32.8 | 32.7 |

EXAMPLE 4

An aqueous solution of ammonium metavanadate was prepared in the following fashion.

48 g. of ammonium metavanadate of "special purity" grade were dissolved in 5.5 lit. of bidistilled water. The concentration of ammonium metavanadate in the solution was equal to 0.07 mole per lit. for vanadium. Then the pH value of the solution was brought to 9.8 by adding a 25% aqueous solution of ammonia.

An aqueous solution of lanthanum nitrate was prepared as follows.

66.8 g. of high-purity lanthanum oxide were dissolved under heating to 70° C. in 0.2 lit. of 70% nitric acid of "special purity" grade (sp. gr. equal to 1.42 g. per. sq. cm. at 20° C.). The concentration of the lanthanum nitrate solution was equal to 0.2 mole per lit. of lanthanum. Then the pH of the solution was adjusted to be 5.5 by adding an aqueous solution of ammonia.

To the solution of ammonium metavanadate which had been poured into a hermetic reactor, the solution of lanthanum nitrate was added in a stoichiometric ratio. The pulp formed due to the reaction was stirred for 18 hours, with the r.p.m. of the stirrer corresponding to Re=1000. The pH of the medium was equal to 9.8. The pulp was allowed to settle over a period of 12 hours. The clarified solution was decanted. The precipitate was filtered on a nutsche filter, dried at a temperature of 80° C. for 1.5 hours, and calcined at a temperature of 900° C. for 2 hours.

100 g. were obtained of crystalline lanthanum orthovandate, which was of white color with crystals of 2–3 mμ in size. The yield of the desired product was 96% of the theoretical amount.

The results of the chemical analysis of the obtained lanthanum orthovanadate are presented in the table below.

| Lanthanum orthovanadate ($LaVO_4$) | Calculated, percent | Found, percent |
|---|---|---|
| Lanthanum oxide | 64.2 | 64.4 |
| Vanadium pentoxide | 35.8 | 35.3 |

EXAMPLE 5

An aqueous solution of ammonium metavanadate was prepared in the following manner.

72 g. of ammonium metavanadate of "special purity" grade were dissolved in 8 lit. of bidistilled water. The concentration of the ammonium metravanadate in the solution was equal to 0.072 mole per lit. of vanadium. Then the pH of the solution was adjusted to be 9.9 by adding a 25% aqueous solution of ammonia.

An aqueous solution of praseodymium nitrate was prepared in the following way.

101 g. of high-purity praseodymium oxide were dissolved under heating to 80° C. in 0.2 lit. of 70% nitric acid of "special purity" grade (sp. gr. equal to 1.42 g. per cu. cm. at 20° C.). The concentration of the praseodymium nitrate solution was 0.21 mole per lit. for praseodymium. Then the pH of the solution was adjusted to be 5.6 by introducing a 25% aqueous solution of ammonia.

To the ammonium metavanadate solution poured into a hermetic reactor there was added the praseodymium nitrate solution in a stoichiometric ratio. The pulp formed as a result of the reaction was stirred for 19 hours, with the r.p.m. of the stirrer corresponding to Re=1500. The pH of the solution was equal to 9.9. The pulp was allowed to settle over a period of 13 hours. The clarified solution was decanted. The precipitate was filtered on a nutsche filter, dried at a temperature of 90° C. for 2 hours, and calcined at a temperature of 900° C. during 2 hours.

There were obtained 150 g. of crystalline praseodymium orthovanadate, which was a green-yellow substance with the size of crystals of 3–4 mμ. The yield of the desired product was 95.5% of the theoretical amount.

The results of the chemical analysis of the obtained praseodyminum orthovanadate are presented in the following table.

| Praseodymium orthovanadate ($PrVO_4$) | Calculated, percent | Found, percent |
|---|---|---|
| Praseodymium oxide | 64.5 | 63.6 |
| Vanadium pentoxide | 35.5 | 34.8 |

EXAMPLE 6

An aqueous solution of ammonium metavanadate was prepared in the following manner.

181 g. of ammonium metavanadate of "special purity" grade were dissolved in 15 lit. of bidistilled water. The concentration of ammonium metavanadate in the solution was 0.09 mole per lit. of vanadium. Then the pH of the solution was adjusted to be 10.6 by adding a 25% aqueous solution of ammonia.

An aqueous solution of holmium nitrate was prepared in the following fashion.

286 g. of high-purity holmium oxide were dissolved under heating to 80° C. in 0.7 lit. of 70% nitric acid of "special purity" grade (sp. gr. equal to 1.42 g. per cu. cm. at 20° C.). The concentration of the holmium nitrate solution was equal to 0.24 mole per lit. for holmium. Then the pH of the solution was adjusted to 5.9 by adding a 25% aqueous solution of ammonia.

To the solution of ammonium metavanadate poured into a hermetic reactor, the holmium nitrate solution was added in a stoichiometric ratio. The resulting pulp formed after the reaction was stirred for 22 hours, with the r.p.m. of the stirrer corresponding to Re=4000. The pH of the solution was equal to 10.4. The pulp was allowed to settle ove a period of 16 hours. The clarified solution was decanted. The precipitate was filtered on a nutsche filter, dried at a temperature of 100° C. for 3 hours, and calcined at a temperature of 1000° C. for 2 hours.

400 g. of crystallineholmium orthovanadate were obtained. The substance was cream colored, with crystals of 3–4 mμ in size. The yield of the desired product was 94% of the theoretical amount.

The results of the chemical analysis of the obtained holmium orthovanadate are presented in the following table.

| Holmium orthovanadate ($HoVO_4$) | Calculated, percent | Found, percent |
|---|---|---|
| Holmium oxide | 67.5 | 67.9 |
| Vanadium pentoxide | 32.5 | 31.9 |

EXAMPLE 7

An aqueous solution of ammonium metavanadate was prepared as follows.

220 g. of ammonium metavanadate of "special purity" grade were dissolved in 18 lit. of bidistilled water. The concentration of ammonium metavanadate in the solution was equal to 0.25 mole per lit. of vanadium. Then the pH of the solution was adjusted to 10.6 by adding a 25% aqueous solution of amomnia.

An aqueous solution of erbium nitrate was prepared in the following way.

359 g. of high-purity erbium oxide were dissolved, under heating to 80° C., in 0.7 lit. of 70% nitric acid of "special purity" grade (sp. gr. equal to 1.42 g. per cu. cm. at 20° C.). The concentration of the erbium nitrate solution was equal to 0.24 mole per lit. for erbium. Then the pH of the solution was adjusted to 6.0 by adding a 25% aqueous solution of ammonia.

To the solution of amomnium metavanadate, which had been poured into a hermetic reactor, there was added the erbium nitrate solution in a stoichiometric ratio.

The pulp formed as a result of the reaction was stirred for 24 hours, with the r.p.m. of the stirrer corresponding to Re=4500. The pH of the medium was equal to 10.5. The pulp was allowed to settle over a period of 16 hours. The clarified solution was decanted. The precipitated matter was filtered on a nutsche filter, dried at a temperature of 90° C. for 4 hours, and calcined at a temperature of 1100° C. for 2 hours.

There were obtained 500 g. of erbium orthovanadate, which was crystalline pink colored substance, with crystals of 2–4 mμ in size. The yield of the desired product was 94% of the theoretical amount.

The results of the chemical analysis of the erbium orthovanadate obtained are presented in the following table.

| Erbium orthovanadate ($ErVO_4$) | Calculated, percent | Found, percent |
|---|---|---|
| Erbium oxide | 67.7 | 68.2 |
| Vanadium pentoxide | 32.3 | 31.8 |

EXAMPLE 8

An aqueous solution of ammonium metavanadate was prepared by using the following procedure.

264 g. of ammonium metavanadate of "special purity" grade were dissolved in 23 lit. of bidistilled water. The concentration of amomnium metavanadate in the solution equalled 0.096 mole per lit. of vanadium. Then the pH of the solution was brought to 10.9 by adding a 25% aqueous solution of ammonia.

An aqueous solution of thulium nitrate was prepared as follows.

434.5 g. of high-purity thulium oxide were dissolved, under heating to 70° C., in 0.7 lit. of 70% nitric acid of "special purity" grade (sp. gr. squal to 1.42 g. per cu. cm. at 20° C.). The concentration of the thulium nitrate solution was equal to 0.24 mole per lit. of thulium. Then the pH of the solution was adusted to 6.1 by adding a 25% aqueous solution of amomnia.

To the ammonium metavanadate solution poured into a hermetic reactor, the thulium nitrate solution was added in a stoichiometric ratio. The pulp formed in the course of the reaction was stirred during 24 hours, with the r.p.m. of the stirrer correspoding to Re=5000. The pH of the medium was equal to 10.5. The pulp was allowed to settle for 16 hours. The clarified solution was decanted. The precipitate was filtered on a nutsche filter, dried at a temperature of 100° C. during 4 hours, and calcined at a temperature of 900° C. during 2 hours.

600 g. of white color crystalline thulium orthovanadate were obtained, the crystals being 2–5 mμ in size. The yield of the desired product was 93.5% of the theoretical amount.

The results of the chemical analysis of the obtained thulium orthovanadate are presented in the following table.

| Thulium orthovanadate ($TuVO_4$) | Calculated, percent | Found, percent |
|---|---|---|
| Thulium oxide | 68.0 | 67.3 |
| Vanadium pentoxide | 32.0 | 3–.9 |

EXAMPLE 9

An aqueous solution of ammonium metavanadate was prepared in the following way.

305 g. of ammonium metavanadate of "special purity" grade were dissolved in 25 lit. of bidistilled water. The concentration of ammonium metavanadate in the solution was equal to 0.098 mole per lit. of vanadium. Then the pH of the solution was adusted to 11 by adding a 25% aqueous solution of amomnia.

An aqueous solution of ytterbium nitrate was prepared as follows.

512 g. of high-purity ytterbium oxide were dissolved, under heating to 70° C., in 0.7 lit. of 70% nitric acid of "special purity" grade (sp. gr. equal to 1.42 g. per cu. cm. at 20° C.). The concentration of the ytterbium nitrate solution was equal to 0.24 mole per lit. for ytterbium. Then the pH of the solution was adjusted to 6.1 by adding a 25% aqueous solution of ammonia.

To the ammonium metavanadate solution poured into a hermetic reactor there was added the ytterbium nitrate solution in a stoichiometric ratio. The pulp formed after the reaction was stirred for 24 hours, with the r.p.m. of the stirrer corresponding to Re=5500. The pH of the medium was equal to 10.4. The pulp was allowed to settle for 16 hours. The clarified solution was decanted. The precipitate was filtered on a nutsche filter, dried at a temperature of 110° C. for 5 hours, and calcined at a temperature of 1000° C. for 2 hours.

700 g. of crystallin white colored ytterbium orthovanadate were obtained, with crystals of 3–6 mμ in size. The yield of the desired product was 93% of the theoretical amount.

The results of the chemical analysis of the obtained ytterbium orthovanadate are presented in the following table.

| Ytterbium orthovanadate ($YbVO_4$) | Calculated, percent | Found, percent |
|---|---|---|
| Ytterbium oxide | 68.4 | 68.2 |
| Vanadium pentoxide | 31.6 | 32.0 |

EXAMPLE 10

An aqueous solution of ammonium metavanadate was prepared as follows.

345 g. of ammonium metavanadate of "special purity" grade were dissolved in 25 lit. of bidistilled water. The concentration of ammonium metavanadate in the solution was equal to 0.1 mole per lit. for vanadium. The pH of the solution was then adjusted to be 11 by adding a 25% aqueous solution of ammonia.

An aqueous solution of lutecium nitrate was prepared in the following fashion.

587 g. of high-purity lutecium oxide were dissolved, under heating to 80° C., in 70% nitric acid of "special purity" grade (sp. gr. equal to 1.42 g. per cu. cm. at 20° C.). The concentration of the lutecium nitrate solution was equal to 0.25 mole per lit. for lutecium. Then the pH of the solution was adjusted to 6.2 by adding a 25% aqueous solution of ammonia.

To the ammonium metavanadate solution, poured into a hermetic reactor, there was added the lutecium nitrate solution in a stoichiometric ratio. The pulp resulting from the reaction was stirred for 24 hours, with the r.p.m. of the stirrer corresponding to Re=6000. The pH of the solution was equal to 10. The pulp was allowed to settle for 18 hours. The clarified solution was decanted. The precipitate was filtered on a nutsche filter, dried at a temperature of 100° C. during 6 hours, and calcined at a temperature of 1200° C. during 2 hours.

800 g. of crystalline white-color lutecium vanadate were obtained, the size of crystals being 4–7 mμ. The yield of the desired product was 93% of the theoretical amount.

The results of the chemical analysis of the obtained lutecium orthovanadate are presented in the following table.

| Lutecium orthovanadate ($LuVO_4$) | Calculated, percent | Found, percent |
|---|---|---|
| Lutecium oxide | 68.6 | 69.0 |
| Vanadium pentoxide | 31.4 | 31.1 |

EXAMPLE 11

An aqueous solution of ammonium metavanadate was prepared in the following way.

117 g. of ammonium metavanadate of "special purity" grade were dissolved in 11 lit. of bidistilled water. The concentration of ammonium metavanadate in the solution was equal to 0.80 mole per lit. of vanadium. Then the pH of the solution was adjusted to 10 by adding a 25% aqueous solution of ammonia.

An aqueous solution of europium nitrate was prepared as follows. 172 g. of high-purity europium oxide were dissolved under heating up to 70° C. in 0.4 lit. of 70% nitric acid of "special purity" grade (sp. gr. equal to 1.42 g. per cu. cm. at 20° C.). The concentration of the europium nitrate solution was equal to 0.23 mole per lit. of europium. Then the pH of the solution was adjusted to 5.7 by adding a 25% aqueous solution of ammonia.

To the solution of ammonium vanadate poured into a hermetic reactor the solution of europium nitrate was added in a stoichiometric ratio. The pulp, formed as a result of the reaction, was stirred for 20 hours, with the r.p.m. of the stirrer corresponding to Re=2500. The pH of the medium was equal to 9.9. The pulp was allowed to settle for 14 hours. The clarified solution was decanted. The precipitate was filtered on a nutsche filter, dried at a temperature of 100° C. for 3 hours, and calcined at a temperature of 900° C. for 2 hours.

250 g. of crystalline white colored europium orthovanadate were obtained, the size of crystals being 2–5 mμ. The yield of the desired product was 94.5% of the theoretical amount.

The results of the chemical analysis of the obtained europium orthovanadate are presented in the following table.

| Europium orthovanadate ($EuVO_4$) | Calculated, percent | Found, percent |
|---|---|---|
| Europium oxide | 65.9 | 66.0 |
| Vanadium pentoxide | 34.1 | 34.2 |

EXAMPLE 12

An aqueous solution of ammonium metavanadate was prepared in the following fashion.

95 g. of ammonium metavanadate of "special purity" grade were dissolved in 10 lit. of bidistilled water. The concentration of ammonium metavanadate in the solution was equal to 0.074 mole per lit. of vanadium. Then the pH of the solution was adjusted to 9.95 by adding a 25% aqueous solution of ammonia.

An aqueous solution of neodymium nitrate was prepared as follows.

136 g. of high-purity neodymium oxide were dissolved, under heating to 70° C., in 0.3 lit. of 70% nitric acid of "special purity" grade (sp. gr. equal to 1.42 g. per cu. cm. at 20° C.). The concentration of the neodymium nitrate solution was equal to 0.22 mole per lit. of neodymium. Then the pH of the solution was adjusted to 5.65 by adding a 25% aqueous solution of ammonia.

To the ammonium metavanadate solution charged into a hermetic reactor the solution of neodymium nitrate was added in a stoichiometric ratio. The pulp formed as a result of the reaction was stirred during 20 hours, with the r.p.m. of the stirrer corresponding to Re=2000. The pH of the medium was equal to 9.8. The clarified solution was decanted. The precipitate was filtered on a nutsche filter, dried at a temperature of 100° C. for 2 hours, and calcined at a temperature of 900° C. for 2 hours.

There were obtained 200 g. of crystalline neodymium orthovanadate which was lilac colored and had crystals of 2–3 mμ in size.

The results of the chemical analysis of the obtained neodymium orthovanadate are presented in the table below. The yield of the desired product was 95% of the theoretical amount.

| Neodymium orthovanadate ($NdVO_4$) | Calculated, percent | Found, percent |
|---|---|---|
| Neodymium oxide | 64.9 | 65.0 |
| Vanadium pentoxide | 35.1 | 35.0 |

EXAMPLE 13

An aqueous solution of ammonium metavanadate was prepared as follows.

73 g. of ammonium metavanadate of "special purity" grade were dissolved in 7.5 lit. of bidistilled water. The concentration of ammonium metavanadate in the solution was equal to 0.075 mole per lit. of vanadium. Then the pH of the solution was adjusted to 9.95 by adding a 25% aqueous solution of ammonia.

An aqueous solution of samarium nitrate was prepared in the following way.

138 g. of high-purity samarium oxide were dissolved, under heating to 80° C., in 0.3 lit. of 70% nitric acid of "special purity" grade, featuring sp. gr. equal to 1.42 g. per cu. cm. at 20° C. The concentration of the samarium nitrate solution was equal to 0.23 mole per lit. of samarium.

Then the pH of the solution was adjusted to 5.65 by adding a 25% aqueous solution of ammonia.

To the ammonium metavanadate solution poured into a hermetic reactor there was added the samarium nitrate solution in a stoichiometric ratio. The pulp formed as a result of the reaction was stirred for 20 hours with the r.p.m. of the stirrer corresponding to Re=2000. The pH of the medium was equal to 9.8. The pulp was allowed to settle for 14 hours. The clarified solution was decanted. The precipitate was filtered on a nutsche filter, dried at a temperature of 90° C. for 2 hours, and calcined at a temperature of 1000° C. for 2 hours.

200 g. of crystalline samarium orthovanadate were obtained, the substance being yellowish-white in color, the size of crystals being 2–3 mμ. The yield of the desired product was 95% of the theoretical amount.

The results of the chemical analysis of the obtained samarium orthovanadate are presented in the following table.

| Samarium orthovandate ($SmVO_4$) | Calculated, percent | Found, percent |
|---|---|---|
| Samarium oxide | 65.7 | 66.5 |
| Vanadium pentoxide | 34.3 | 33.8 |

EXAMPLE 14

An aqueous solution of ammonium metavanadate was prepared in the following fashion.

114 g. of ammonium metavanadate of "special purity" grade were dissolved in 14 lit. of bidistilled water. The concentration of ammonium metavanadate in the solution was equal to 0.085 mole per lit. of vanadium. Then the pH of the solution was adjusted to be 10 by adding a 25% aqueous solution of ammonia.

An aqueous solution of gadolinium nitrate was prepared as follows.

176 g. of high-purity gadolinium oxide were dissolved, under heating to 80° C., in 0.5 lit. of 70% nitric acid of "special purity" grade. The concentration of the gadolinium nitrate solution was equal to 0.23 mole per lit. of gadolinium. Then the pH of the solution was adjusted to 5.7 by adding a 25% aqueous solution of ammonia.

To the ammonium metavanadate solution poured into a hermetic reactor the gadolinium nitrate solution was added in a stoichiometric ratio. The pulp formed as a result of the reaction was stirred for 20 hours, with the r.p.m. of the stirrer corresponding to Re=2500. The pH of the medium was equal to 10. The pulp was allowed to settle 14 hours. The clarified solution was decanted. The precipitate was filtered on a nutsche filter, dried at a temperature of 90° C. for 4 hours, and calcined at a temperature of 1000° C. during 2 hours.

250 g. were obtained of crystalline gadolinium orthovanadate, white in color, with crystals 2–4 mμ in size. The yield of the desired product was 94.5% of the theoretical amount.

The results of the chemical analysis of the obtained gadolinium orthovanadate are presented in the following table.

| Gadolinium orthovanadate ($GdVO_4$) | Calculated, percent | Found, percent |
|---|---|---|
| Gadolinium oxide | 66.6 | 66.8 |
| Vanadium pentoxide | 33.4 | 33.6 |

EXAMPLE 15

An aqueous solution of ammonium metavanadate was prepared as follows.

209 g. of ammonium metavanadate of "special purity" grade were dissolved in 18 lit. of bidistilled water. The concentration of ammonium metavanadate in the solution was equal to 0.09 mole per lit. of vanadium. Then the pH of the solution was adjusted to be 10.9 by adding a 25% aqueous solution of ammonia.

An aqueous solution of yttrium nitrate was prepared in the following manner.

188.6 g. of high-purity yttrium oxide were dissolved, under heating to 80° C., in 0.7 lit. of 70% nitric acid of "special purity" grade (sp. gr. equal to 1.42 g. per cu. cm. at 20° C.). The concentration of the yttrium nitrate solution was equal to 0.2 mole per lit. of yttrium. Then the pH of the solution was adjusted to 6 by adding a 25% aqueous solution of ammonia.

An aqueous solution of thulium nitrate was prepared in the following fashion.

20.6 g. of high-purity thulium oxide were dissolved, under heating, to 80° C., in 0.2 lit. of 70% nitric acid of "special purity" grade. The concentration of the thulium nitrate solution was equal to 0.2 mole per lit. for thulium. Then the pH of the solution was brought to 6.1 by adding a 25% aqueous solution of ammonia.

To the ammonium metavanadate solution poured into a hermetic reactor, a preliminarily prepared mixture of the solutions of yttrium nitrate and thulium nitrate was added in a stoichiometric ratio. The pulp formed as a result of the reaction was stirred for 22 hours, with the r.p.m. of the stirrer corresponding to Re=3500. The pH of the medium was equal to 10.5. The pulp was allowed to settle during 16 hours. The clarified solution was decanted. The precipitate was filtered on a nutsche filter, dried at a temperature of 100° C. during 4 hours, and calcined at a temperature of 1000° C. during 2 hours.

There were obtained 350 g. of yttrium orthovanadate doped with 6 at percent thulium. The yield of the product was 94% of the theoretical amount. The desired product had a crystalline structure with the size of crystals of 4–6 mμ, and conformed to the Formula $Tu_{0.06}Y_{0.94}VO_4$.

EXAMPLE 16

An aqueous solution of ammonium metavanadate was prepared in the following way.

118.6 g. of ammonium metavanadate of "special purity" grade were dissolved in 11 lit. of bidistilled water. The concentration of ammonium metavanadate in the solution was equal to 0.09 mole per lit. of vanadium. Then the pH of the solution was adjusted to be 10.9 by adding a 25% aqueous solution of ammonia.

An aqueous solution of yttrium nitrate was prepared as follows.

111 g. of high-purity yttrium oxide were dissolved, under heating to 80° C., in 0.4 lit. of 70% nitric acid of "special purity" grade. The concentration of the yttrium nitrate solution was equal to 0.2 mole per lit. of yttrium. Then the pH of the solution was adjusted to 6 by adding a 25% aqueous solution of ammonia.

An aqueous solution of holmium nitrate was prepared in the following fashion.

5.9 g. of high-purity holmium oxide were dissolved, under heating to 80° C., in 0.05 lit. of 70% nitric acid of "special purity" grade. The concentration of the holmium nitrate solution was equal to 0.2 mole per lit. of holmium. Then the pH of the solution was adjusted to 5.9 by adding a 25% aqueous solution of ammonia.

To the ammonium metavanadate solution poured into a hermetic reactor, a preliminarily prepared mixture of the solutions of yttrium nitrate and holmium nitrate was added in a stoichiometric ratio. The pulp resulting due to the reaction was stirred for 16 hours, with the r.p.m. of the stirrer corresponding to Re=2500. The pH of the medium was equal to 10.5. The pulp was allowed to settle for 14 hours. The clarified solution was decanted. The precipitate was filtered on a nutsche filter, dried at a temperature of 100° C. for 4 hours, and calcined at a temperature of 1000° C. for 2 hours.

There were obtained 200 g. of yttrium orthovanadate, doped with 3 at. percent holmium. The yield of the product was 95% of the theoretical amount. The product was of a crystalline structure with crystals 4–6 mμ in size, and conformed to the Formula $HO_{0.03}Y_{0.97}VO_4$.

EXAMPLE 17

An aqueous solution of ammonium metavanadate was prepared as follows.

63 g. of ammonium metavanadate of "special purity" grade were dissolved in 4 lit. of bidistilled water. The concentration of the ammonium metavanadate solution was equal to 0.09 lit. of vanadium. Then the pH of the solution was adjusted to 10 by adding a 25% aqueous solution of ammonia.

An aqueous solution of yttrium nitrate was prepared in the following fashion.

53 g. of high-purity yttrium oxide were dissolved, under heating to 70° C., in 70% nitric acid of "special purity" grade. The concentration of the yttrium nitrate solution was equal to 0.2 mole per lit. of yttrium. Then the pH of the solution was brought to 6 by adding a 25% aqueous solution of ammonia.

An aqueous solution of terbium nitrate was prepared in the following way.

0.98 g. of high-purity terbium oxide were dissolved, under heating to 70° C., in 0.01 lit. of 70% nitric acid of "special purity" grade. The concentration of the terbium nitrate solution was equal to 0.2 mole per lit. of terbium. Then the pH of the solution was adjusted to 5.8 by adding a 25% aqueous solution of ammonia.

To the ammonium metavanadate solution poured into a hermetic reactor, there was added a preliminarily prepared mixture of the yttrium nitrate and terbium nitrate solutions in a stoichiometric ratio. The pulp formed due to the reaction was stirred for 18 hours, with the r.p.m. of the stirrer corresponding to Re=2500. The pH of the medium was equal to 10.3. The pulp was allowed to settle for 15 hours. The clarified solution was decanted. The precipitate was filtered on a nutsche filter, dried at a temperature of 90° C. for 2 hours, and calcined at a temperature of 1000° C. for 2 hours.

There were obtained 100 g. of yttrium orthovanadate, doped with 1 at. percent terbium. The yield of the product was 96% of the theoretical amount. The product had a crystalline structure, with the size of crystals 3–6 mμ, and conformed to the formula $Tb_{0.01}Y_{0.99}VO_4$.

EXAMPLE 18

An aqueous solution of ammonium metavanadate was prepared as follows.

239 g. of ammonium metavanadate of "special purity" grade were dissolved in 20 lit. of bidistilled water.

The concentration of ammonium metavanadate in the solution was equal to 0.09 mole per lit. of vanadium. Then the pH of the solution was adjusted to 10.9 by adding a 25% aqueous solution of ammonia.

An aqueous solution of yttrium nitrate was prepared in the following fashion.

210 g. of high-purity yttrium oxide were dissolved, under heating to 80° C., in 0.9 lit. of 70% nitric acid of "special purity" grade. The concentration of the yttrium nitrate solution was equal to 0.2 mole per lit. for yttrium. Then the pH of the solution was adjusted to 6 by adding a 25% aqueous solution of ammonia.

An aqueous solution of europium nitrate was prepared as follows.

28.4 g. of high purity europium oxide were dissolved, under heating to 70° C., in 0.3 lit. of 70% nitric acid of "special purity" grade. The concentration of the europium nitrate solution was equal to 0.2 mole per lit. for europium. Then the pH of the solution was adjusted to be 5.7 by adding a 25% aqueous solution of ammonia.

To the ammonium metavanadate solution poured into a hermetic reactor there was added in a stoichiometric ratio a preliminarily prepared mixture of the solutions of yttrium nitrate and europium nitrate. The pulp formed due to the reaction was stirred during 22 hours, with the r.p.m. of the stirrer corresponding to Re=4000. The pH of the medium was equal to 10.4. The pulp was allowed to settle for 18 hours. The clarified solution was decanted. The precipitate was filtered on a nutsche filter, dried at a temperature of 100° C. for 5 hours, and calcined at a temperature of 900° C. for 2 hours.

There were obtained 400 g. of yttrium orthovanadate doped with 8 at. percent europium. The yield of the product was 94% of the theoretical amount. The product was of a crystalline structure, with crystals of 4–8 mμ in size, and conformed to the formula $Eu_{0.8}Y_{0.92}VO_4$.

The obtained product is a highly effective cathodoluminescent phosphor, emitting in the red region of the spectrum with the wavelength λ=6190 A., and is used in color kinescopes.

EXAMPLE 19

An aqueous solution of ammonium metavanadate was prepared in the following way.

180 g. of ammonium metavanadate of "special purity" grade were dissolved in 15 lit. of bidistilled water. The concentration of ammonium metavanadate in the solution was equal to 0.09 mole per lit. for vanadium. Then the pH of the solution was adjusted to be 10.9 by adding a 25% aqueous solution of ammonia.

An aqueous solution of yttrium nitrate was prepared as follows.

165 g. of high-purity yttrium oxide were dissolved, under heating to 80° C., in 0.8 lit. of 70% nitric acid of "special purity" grade. The concentration of the yttrium nitrate solution was equal to 0.2 mole per lit. of yttrium. Then the pH of the solution was adjusted to 6 by adding a 25% aqueous solution of ammonia.

An aqueous solution of neodymium nitrate was prepared in the following fashion.

13 g. of high-purity neodymium oxide were dissolved, under heating to 80° C., in 0.1 lit. of 70% nitric acid of "special purity" grade. The concentration of the neodymium nitrate solution was equal to 0.2 mole per lit. of neodymium. Then the pH of the solution was adjusted to 5.65 by adding a 25% aqueous solution of ammonia.

To the solution of ammonium metavanadate poured into a mermetic reactor there was added, in a stoichiometric ratio, a preliminarily prepared mixture of the solutions of yttrium nitrate and neodymium nitrate. The pulp formed due to the reaction was stirred for 20 hours, with the r.p.m. of the stirrer corresponding to Re=3500. The pH of the medium was equal to 10.3. The pulp was allowed to settle during 16 hours. The clarified solution was decanted. The precipitate was filtered on a nutsche filter, dried at a temperature of 100° C. for 3 hours, and calcined at a temperature of 900° C. for 2 hours.

There were obtained 300 g. of yttrium orthovanadate doped with 5 at. percent neodymium. The yield of the product was 49% of the theoretical amount. The product was of a crystalline structure, with crystals of 3–4 mμ in size, and conformed to the formula $Nd_{0.05}Y_{0.95}VO_4$.

The investigations of single crystals grown from the obtained product have shown them to be promising media for laser oscillators. At room temperature laser oscillators based on said single crystals oscillate at two wavelengths: $\lambda_1$=10641 A. and $\lambda_2$=10664 A. The threshold pumping energies for the said wavelengths amount to about 1.3 and 6 j., respectively.

According to the spectral analysis data, the amount of admixtures in the orthovanadates of rare-earth metals obtained in compliance with the method of the present invention, proves to be as follows: Mg, less than $3.10^{-4}$; Cr, less than $1.10^{-4}$; Ca, less than $5.10^{-4}$; Fe, less than $5.10^{-4}$; Co, less than $5.10^{-4}$; Ni, less than $5.10^{-4}$; Cu, less than $1.10^{-5}$; Mo, less than $5.10^{-4}$; Pb, less than $3.10^{-4}$.

What is claimed is:

1. A method of preparing the orthovanadate of a rare-earth metal which comprises reacting an aqueous solution of the rare-earth metal nitrate having a pH of 5.5 to 6.2 with an aqueous solution of ammonium metavanadate having a pH of 9.8 to 11 under dynamic conditions with Re=1000 to 6000 until the pH of the reaction mixture becomes 9.5 to 10.5, separating the precipitate of rare-earth metal orthovanadate, drying the precipitate at a temperature of 80 to 120° C. and calcining the dried material at a temperature of 900 to 1200° C.

2. A method as in claim 1 wherein the rare-earth metal nitrate solution has a pH of 6 to 6.2, the ammonium metavanadate solution has a pH of 10 to 11 and the reaction is carried out until the pH of the reaction mixture becomes 9.8 to 10.5.

References Cited

UNITED STATES PATENTS

| | | | |
|---|---|---|---|
| 3,441,512 | 4/1969 | Durkee | 23—51 R X |
| 3,322,552 | 5/1967 | Roberts et al. | 23—51 R X |

FOREIGN PATENTS

| | | | |
|---|---|---|---|
| 950,774 | 2/1964 | Great Britain | 23—51 |

OTHER REFERENCES

Rane et al.: "Journal of The Indian Chemical Society," vol. 8, 1931, pp. 289–292.

Banejee: "Journal of The Indian Chemical Society," vol. 22, 1945, pp. 280–282

HERBERT T. CARTER, Primary Examiner

U.S. Cl. X.R.

23—51 R, 23, 24 R; 252—301.4